United States Patent [19]
Sawada et al.

[11] Patent Number: 5,589,086
[45] Date of Patent: Dec. 31, 1996

[54] METHOD AND APPARATUS FOR ELECTRICAL DISCHARGE MACHINING WITH CONTROL OF A SERVOMECHANISM BY A POSITION LOOP AND A SPEED LOOP

[75] Inventors: Kiyoshi Sawada, Sunto-gun; Shun'ichi Odaka, Oshino-mura, both of Japan

[73] Assignee: Fanuc Ltd., Yamanashi, Japan

[21] Appl. No.: 313,278

[22] PCT Filed: Feb. 2, 1994

[86] PCT No.: PCT/JP94/00148

§ 371 Date: Oct. 5, 1994

§ 102(e) Date: Oct. 5, 1994

[87] PCT Pub. No.: WO94/17948

PCT Pub. Date: Aug. 18, 1994

[30] Foreign Application Priority Data

Feb. 5, 1993 [JP] Japan ................... 5-040717

[51] Int. Cl.⁶ ............... B23H 1/02; B23H 7/18; B23H 7/20
[52] U.S. Cl. .............................................. 219/69.16
[58] Field of Search ................... 219/69.13, 69.17, 219/69.16, 69.2

[56] References Cited

U.S. PATENT DOCUMENTS 4,564,912  1/1986  Schwefel ............... 219/69.16

FOREIGN PATENT DOCUMENTS

| 139016 | 5/1985 | European Pat. Off. . |
| 59-166423 | 9/1984 | Japan . |
| 60-48222 | 3/1985 | Japan . |
| 62-84925 | 4/1987 | Japan ............... 219/69.16 |
| 1-164524 | 6/1989 | Japan ............... 219/69.17 |
| 2-53520 | 2/1990 | Japan . |

*Primary Examiner*—Geoffrey S. Evans
*Attorney, Agent, or Firm*—Staas & Halsey

[57] ABSTRACT

An electric discharge machining apparatus generates an electric discharge by applying a voltage across a tool electrode and a workpiece. Axial movement amounts for controlling the tool electrode are first input into a plurality of corresponding position loop control sections and speed loop control sections to thereby control corresponding servomechanisms. An electric discharge machining condition corresponding to a gap between the tool and the workpiece is then detected by a gap condition detector. To maintain an appropriate electric discharge machining condition, a detected value and a target value of the tool are subtracted to produce a deviation value. The deviation value is then multiplied by axial components of a direction vector to produce retraction speed commands. Integrators integrate the retraction speed commands to produce correction movement amounts which are then added to the axial movement amounts and input into corresponding position loop control sections. The retraction speed commands are also directly input into corresponding speed loop control sections to thereby effect movement of the tool electrode.

17 Claims, 7 Drawing Sheets

METHOD AND APPARATUS FOR ELECTRICAL DISCHARGE MACHINING WITH CONTROL OF A SERVOMECHANISM BY A POSITION LOOP AND A SPEED LOOP

TECHNICAL FIELD

The present invention relates to a method for controlling electric discharge machining and an apparatus therefor. More particularly, the present invention relates to an electric discharge machining apparatus which generates an electric discharge by applying a voltage across a tool electrode and a workpiece which are opposed to each other through a small gap in a liquid. The gap between the tool electrode and the workpiece is optimized by using a driving means, such as a servomotor, in order to keep the electric discharge constant during a machining operation.

BACKGROUND ART

An electric discharge machining apparatus machines a workpiece into a desired shape by moving tool electrode with respect to a workpiece in accordance with a programmed machining path while material is removed from the workpiece by an electric discharge generated by applying a voltage across the tool electrode and the workpiece. In the machining operation performed by this electric discharge machining apparatus, an electric discharge machining condition must be kept constant. The electric discharge machining condition is provided by the average working voltage between the tool electrode and the workpiece (gap voltage), the time taken from the application of voltage across the tool electrode and the workpiece to the generation of electric discharge, or other factors. For this purpose, the electric discharging gap is adjusted by moving the tool electrode with respect to the workpiece in accordance with a detected electric discharge machining condition.

In the case of a conventional electric discharge machining control apparatus, the electric discharging gap is adjusted by giving a command for the position of retraction of the tool electrode to the position controller (hereinafter referred to as a servomechanism), the position of retraction being determined by the direction and distance of the relative retraction of the tool electrode from the workpiece depending on the detected electric discharge machining condition. Such retracting direction, for example, may be the direction opposite to the direction of the relative movement of the tool electrode with respect to the workpiece at the machining position, or the direction perpendicular to the direction of the relative movement of a wire electrode with respect to the workpiece, that is, the direction normal to the work surface (e.g. in the case of the finishing on a wire electric discharge machine or the machining on a diesinking electric discharge machine). In place of these directions, the direction set in an orthogonal three-axis coordinate system is sometimes provided.

FIG. 6 is a block diagram showing the conventional relative feed control of the tool electrode with respect to the workpiece. In FIG. 6, reference numeral 1 denotes a tool electrode, and 2 denotes a workpiece. A gap condition detector 3 detects the electric discharge condition of the gap between the tool electrode 1 and the workpiece 2 (for example, detects the average working voltage). A command distribution mechanism 4 is composed of a digital differential analyzer (DDA) and the like in a numerical control unit to distribute command values to the positions commanded by a machining program. Numerical characters 5x, 5y, and 5z denote the servomechanisms for X, Y and Z axes, respectively; 6x, 6y and 6z denote servomotors; and 7x, 7y and 7z denote position detectors for detecting the rotational position of each servomotor. A transmission mechanism 8 moves the tool electrode 1 with respect to the workpiece 2 (FIG. 6 shows an example in which the tool electrode is moved by way of three servomotors 6x, 6y and 6z).

The gap condition detector 3 detects the condition between the tool electrode 1 and the workpiece 2, such as the average working voltage, and determines the deviation $\epsilon$ (=Vg−Vs) between the value Vg of the detected condition and the value Vs of the target (preset) condition. Then, the command value distribution mechanism 4 distributes the movement commands ($M_{cx}$, $M_{cy}$, $M_{cz}$) to the servomechanisms 5x, 5y and 5z of each axis so that the tool electrode 1 moves to a position commanded by the machining program by a distance proportional to the value of the deviation e. The servomechanisms of the axes respectively drive the servomotors 6x, 6y and 6z of the corresponding axes so that the tool electrode 1 is moved with respect to the workpiece 2 through the transmission mechanism 8. The rotational position of each servomotor is detected by the position detectors 7x, 7y, 7z, and the feedback control of the position is performed by the servomechanisms 5x, 5y and 5z. The feedback control of speed is also performed by the servomechanisms 5x, 5y, and 5z.

FIG. 7 is a block diagram showing a tool electrode feed control, which is of a type somewhat different from the conventional type shown in FIG. 6. The difference from the method shown in FIG. 6 is that a distribution mechanism 4' is provided in addition to the command value distribution mechanism 4 for distributing movement commands to each axis, to thereby move the tool electrode 1 to the position commanded by the program.

In the tool electrode feed control shown in FIG. 7, the gap condition detector 3 detects the condition of the electric discharging gap (the size of the gap). The distribution mechanism 4' determines the movement amounts Px'. Py' and Pz' of X, Y and Z axes depending on the deviation $\epsilon$ (=Vg−Vs) between the detected value Vg and the preset target value Vs, and adds these amounts to the amounts, Px, Py and Pz distributed to each axis, which are outputted from the command value distribution mechanism 4, to issue the movement command to the servomotor of each axis.

With the tool electrode feed control method shown in FIGS. 6 and 7, the electric discharging gap is large, and therefore the value Vg of a detected condition is large accordingly. For this reason, when Vg−Vs=$\epsilon$>0 (Vs: target value), tool feed is controlled so that the tool electrode advances toward the workpiece by a distance proportional to the deviation $\epsilon$ to decrease the electric discharging gap. On the other hand, when the electric discharging gap is small, and therefore the value Vg of detected condition is small, that is, Vg−Vs =$\epsilon$ <0, tool feed is controlled so that the tool electrode retracts away from the workpiece by a distance proportional to the deviation $\epsilon$ to increase the electric discharging gap. In either of the methods shown in FIGS. 6 and 7, the servomechanisms 5x, 5y, and 5z determine the movement speed of the tool electrode or the workpiece by comparing the current position with the target position outputted by the command value distribution mechanism 4 or the distribution mechanism 4' based on the electric discharge condition, and move the tool electrode or the workpiece.

In the electric discharge machining apparatus, in order to maintain normal electric discharge for removing the material from the workpiece, it is necessary for the electric discharging gap between the tool electrode and the workpiece to be kept at an appropriate value. For this purpose, therefore, it is necessary to adjust the electric discharging gap so that the tool electrode or the workpiece can be retracted (to widen the gap) for removing the chips of the workpiece accumulated during the machining of the workpiece using the electric discharge or for stopping the abnormal electric discharge for restoring normal electric discharge.

Specifically, for improving the material removal capability per unit time, it is necessary to rapidly detect the condition of electric discharging gap, which changes momentarily due to the progress of electric discharge machining and the accumulation of chips, for feeding back the detected conditions to the controller so as to restore the normal condition in a possible shortest time. Also, in order to restrain the increase in abnormality, it is effective to take actions for solving the problems as rapidly as possible when chips are accumulated or abnormal electric discharge has occurred. Therefore, the control unit, which moves the tool electrode or the workpiece in accordance with the detected electric discharge condition, must have a high response to provide high electric discharge machining efficiency and to decrease the abnormality of machining.

However, as described above, in the case of the conventional electric discharge machining control apparatus, the command value distribution mechanism 4 commands the movement amounts $M_{cx}$, $M_{cy}$ and $M_{cz}$ for the tool electrode 1 or the workpiece 2, and so the response of the control apparatus cannot be increased due to the following reasons.

First, the command value distribution mechanism 4 must perform calculations to distribute movement amounts (Px, Py, Pz) and thereby maintain an optimum electric discharging gap for a drive mechanism of plural axes (X, Y, and Z axes) consisting of servomotors and feed screws. Moreover, regarding the movement path of the tool electrode, which is programmed in advance, work is needed to determine whether or not the current tool position has reached its end point or the boundary point of individual movement units. For this reason, the calculation time required for the distribution of movement command values to each axis cannot be decreased beyond the time taken for the above processing; the processing time has a lower limit value. Thus, the period in which the calculation for command value distribution is performed must be a time interval larger than the aforementioned lower limit value. Therefore, the time elapsing from the time when the electric discharging gap condition is observed to the time when the next calculation for command value distribution is performed will be wasted, producing a delay.

Further, when the given command is for a very small movement; the servomechanisms 5x, 5y and 5z make the follow-up movement only at a very low speed proportional to the commanded amount of movement (since the gain is usually adjusted to prevent the overshooting), and so their movements delay by the time equivalent to the inverse number of the position feedback control gain, which is a constant of the proportionality.

The servomechanisms 5x, 5y and 5z respectively constitute closed loops, in which the information concerning the rotational position of each servomotor is fed back from the position detectors 7x, 7y and 7z, and so when the position control gain is increased, the gain margin will decrease, thereby causing the performance of each servomechanism to become unstable. For this reason, the position control gain cannot be increased indiscriminately. Therefore, it is difficult to decrease the delay time, and the follow-up delay time of servomechanism lowers the response of the control of electric discharging gap.

To improve the response of the servomechanism, the feedforward control of position is sometimes applied. In this method, the value proportional to the value obtained by differentiating the movement commands Px, Py and Pz, issued from the command value distribution mechanism 4, is added to the speed command obtained by the normal position loop processing to provide the speed command for the speed loop processing. Even this feedforward control is not good enough to compensate the time delay occurring before the command value distribution mechanism 4 performs calculation for distribution to determine the movement command amount of each axis. Moreover, since the differentiation of the movement command is actually made by dividing the deviation of movement commands distributed for each command time interval (distribution period) by the command time interval, the accuracy of the differentiated value deteriorates in proportion to the command time interval. Therefore, in the case of the feedforwarding control, the weight of the portion based on the differentiated value in the speed command value cannot be increased. Thus, there is a limit in increasing the response of electric discharge control even if the feedforward control is used.

As discussed above, ill carrying Out the electric discharge machining, various conventional methods of electric discharging gap control are not good enough for obtaining and adequately effective response, thereby causing inadequate operating efficiency and inadequate protection against abnormal machining.

SUMMARY OF THE INVENTION

An object of the present invention is to provide a method for controlling electric discharge machining and an apparatus therefor, which has a an effective response and is capable of providing stable electric discharging gap control.

To achieve the above object, the present invention provides a method for controlling electric discharge machining, in which the electric discharge machining condition of the gap between a tool electrode and a workpiece is detected, and servomechanisms are driven to relatively move the tool electrode with respect to the workpiece so that the detected value of the electric discharge machining condition agrees with the target value to control the distance of said gap, wherein the speed command outputted in the present direction from the position loop control section in the servomechanism is corrected on the basis of the deviation between the detected value of the electric discharge machining condition and the target value to provide the speed command to speed loop.

Preferably, the correction value of speed command based on the deviation is integrated, and the integrated value is added to the movement command to the position loop.

Preferably, the value, which is proportional to the value obtained by multiplying the component value of the vector of a preset direction by the deviation, is used as the correction value to the speed command to the speed loop of the servomechanism of each axis.

Preferably, the correction value of speed command for each axis is integrated, and the integrated value is added to the movement command to the position loop of each axis.

Preferably, the deviation is integrated, and the value, which is proportional to the value obtained by multiplying each axial component value of a preset direction vector by the integrated value, is added to the movement command to the position loop of each corresponding axis.

Also, the present invention provides an apparatus for controlling electric discharge machining comprising: a numerical control unit for controlling an electric discharge machine which reads a machining program and writes a movement command for each axis and a retracting direction preset together with the movement command for each distribution period into a memory; a servomechanism for relatively moving a tool electrode with respect to a workpiece by equally dividing the movement command read from the memory to determine the movement command for each position loop processing period, executing position loop processing, speed loop processing and current loop processing respectively, and driving the servomotor for each axis; an electric discharge machining condition detecting device for monitoring the electric discharge condition in the gap between an electrode and a workpiece during machining operation, and a position detector for detecting the rotational position and speed of the servomotor, wherein, the controlling apparatus further comprises: retracting speed command generating means for multiplying the deviation between the output from the electric discharge machining condition detecting device and the target electric discharge machining condition value by component of each axis of retracting direction stored in the memory and by a predetermined constant; and speed command correcting means for directly feeding back a positive retracting speed command, which is the output from the retracting speed command generating means of each axis, to the speed control section in the servomechanism of each respective axis.

Preferably, the controlling apparatus further comprises: integrators for integrating the retracting speed command, which is the output from the retracting speed command generating means of each axis; and position command correcting means for positive feedback of the output of the integrator of each axis to the position control section in the servomechanism of the corresponding axis. Alternatively, the controlling apparatus further comprises: one integrator for integrating the deviation between the output from the electric discharge machining condition detecting device and the target electric discharge machining condition value; retracting amount calculating means for obtaining the retracting amount for each axis by multiplying the output of the integrator by each axial component of a retracting direction stored in the memory and by a predetermined constant; and position command correcting means for positive feedback of the output of the retracting amount calculating means to the position control section in the servomechanism of the corresponding axis.

As described above, according to the present invention, the deviation between the detected value of the electric discharge machining condition and the target value is determined, and the speed command to the speed loop processing is corrected on the basis of this deviation. Therefore, the speed increases with the increase of the deviation, and the gap between the tool electrode and the workpiece is corrected so that the deviation becomes zero. The correction of the speed causes the current position of the tool electrode with respect to the workpiece to deviate from the position commanded by the program. Thus, the correction amount of the speed is integrated to determine the movement amount for correction, and the movement amount for correction is added to the movement command of the position loop to prevent the deviation of the current position.

BEST MODE FOR CARRYING OUT THE INVENTION

Figure 1:
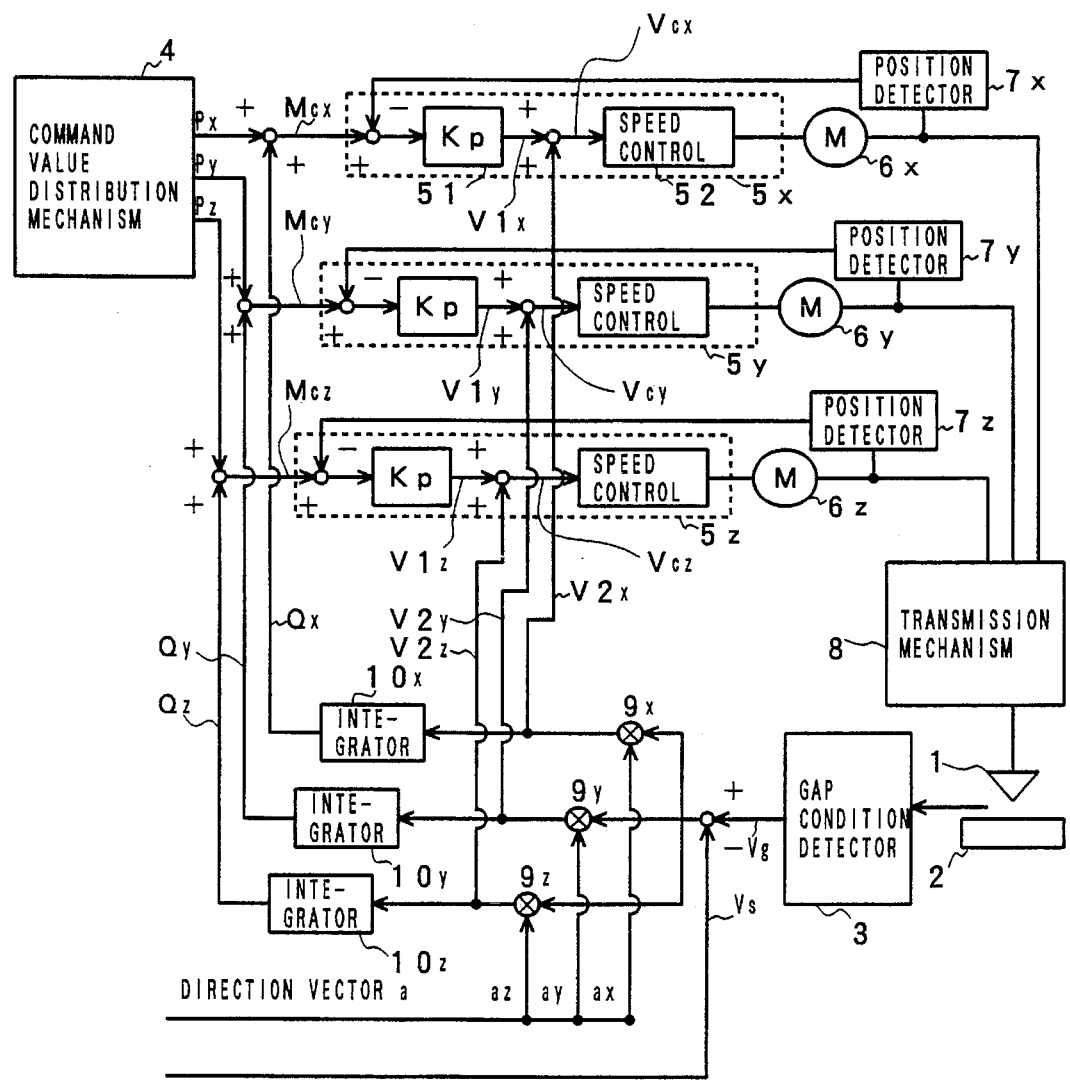
FIG. 1 is a block diagram for the control of the relative feed of a tool electrode with respect to a workpiece, in accordance with a first embodiment of the present invention.
Figure 6:
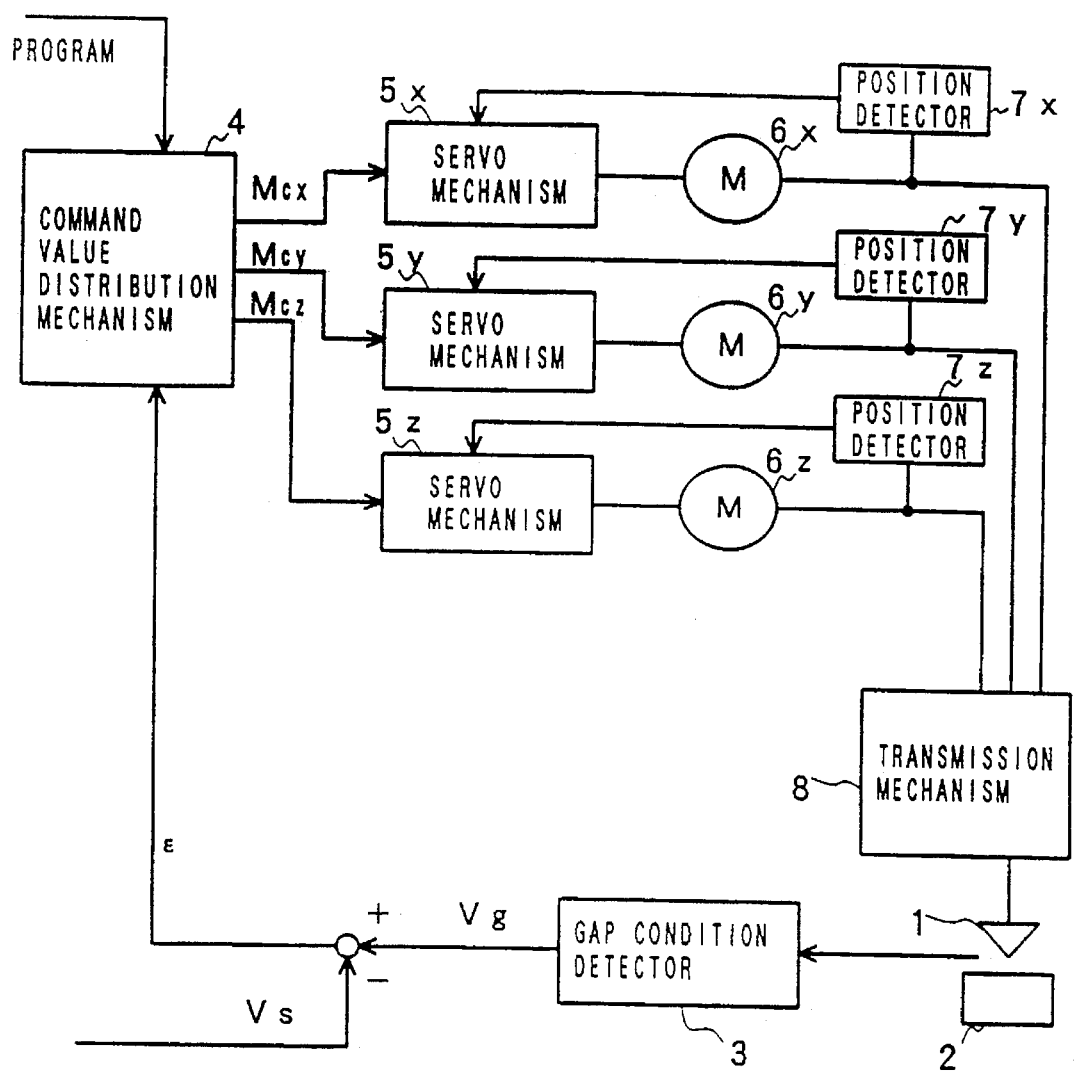
FIG. 6 is a block diagram for the relative feed control of the tool electrode with respect to the workpiece by conventional method.

FIG. 1 is a block diagram relating to electric discharge control in accordance with one embodiment of the present invention. In FIG. 1, the same reference numerals are applied to the same elements as in the block diagram for conventional relative feed control of a tool electrode with respect to a workpiece, which is shown in FIG. 6. In FIG. 1, the servomechanisms 5x, 5y and 5z are indicated by dividing each into a position control section and a speed control section.

In this embodiment, unlike the conventional example shown in FIG. 6, a command value distribution mechanism 4 distributes the movement command values (Px, Py, Pz) commanded by the machining program to each axis, and then outputs to the servomechanisms 5x, 5y, 5z of the corresponding axis. A gap condition detector 3 detects the electric discharge machining condition (for example, the average working voltage or the time required for generating the electric discharge from the application of voltage) of the gap between a tool electrode 1 and a workpiece 2, and determines the deviation $\epsilon$ by subtracting a target value Vs from a detected value Vg. In this embodiment, this deviation $\epsilon$ becomes a gap speed command, which is a correction amount for correcting the speed command determined by the position loop processing.

Multipliers 9x, 9y and 9z multiply the aforementioned gap speed command $\epsilon$ by components ax, ay, and az for each axis of a direction vector a of the retracting direction, which is programmed in the machining program together with the movement path command (when the retracting direction is constant regardless of the machining path, this direction vector may be set manually, not in the machining program), to determine the retracting speed commands $V_{2x}$, $V_{2y}$ and $V_{2z}$ of X-, Y- and Z-axis components for correcting the speed command.

Integrators 10x, 10y and 10z integrate the retracting speed commands $V_{2x}$, $V_{2y}$ and $V_{2z}$ of each axial component. Specifically, the integrators 10x, 10y and 10z integrate the retracting speed commands of each axial component, and output the retracting movement amount of each axial component as the correction movement amounts Qx, Qy, Qz. These movement amounts are added to the movement amounts Px, Py and Pz of each axis, which are distributed by the command value distribution mechanism 4 respectively to provide the movement commands $M_{cx}$, $M_{cy}$ and $M_{cz}$ to the position control section in the servomechanism of each axis The aforementioned retracting speed commands $V_{2x}$, $V_{2y}$ and $V_{2z}$ are added to the speed commands $V_{1x}$, $V_{1y}$ and $V_{1z}$ obtained by the position loop control of the servomechanisms 5x, 5y and 5z of each axis respectively, to provide the speed commands $V_{cx}$, $V_{cy}$ and $V_{cz}$ to the speed control section in the servomechanism of each axis.

Now, the servomechanism 5x of the X axis will be described. The value ($M_{cx}$=Px+Qx) obtained by adding the output Qx of the integrator 10x to the movement command Px of the X axis, which is distributed from the command value distribution mechanism 4, is inputted as the movement command to the position control section in the servomechanism 5x. Then, the movement amount detected by the position detector 7x is subtracted from the movement command $M_{cx}$ to determine the position deviation, and the speed command $V_{1x}$ is determined, like the conventional method, by multiplying the position deviation by the position loop gain Kp. Next, the retracting speed command $V_{2x}$ for the X axis is added to the speed command $V_{1x}$ to provide the speed command $V_{cx}$ (=$V_{1v}$–$V_{2x}$) to the speed control section 52. On the other hand, at the speed control section, the feedback control of speed is performed based on the inputted speed command $V_{cx}$ in the same way as the conventional method to drive and control servomotor 6x for moving the tool electrode 1 with respect to the workpiece 2 via the transmission mechanism 8. The operations of the servomechanisms 5y and 5z for Y and Z axes are the same as the above-described operation of the servomechanism 5x for the X axis.

As described above, the relative movement of the tool electrode 1 with respect to the workpiece 2 is controlled by adding for correction the speed command of a value in the commanded direction and corresponding to the electric discharge condition detected by the gap condition detector 3 to the speed command given in response to the movement command given by the program and the output of the position detector.

Thus, when the gap between the tool electrode 1 and the workpiece 2 is larger than the target value (for example, when, as a result, a phenomenon that the average working voltage exceeds the target value has occurred), the output Vg of gap condition detector 3 becomes higher than the target value Vs, so that the gap speed command ∈, which is the deviation between Vg and Vs, takes a positive value. As a result, the retracting speed commands $V_{2x}$, $V_{2y}$, $V_{2z}$ (=∈×ax, ∈×ay, ∈×az) for each axis, which are added to the speed commands $V_{1x}$, $V_{1y}$, $V_{1z}$ outputted from the position loop of the servomechanism of each axis, take a positive value, so that the tool electrode 1 moves in a preset direction with respect to the workpiece 2, that is, the gap between the workpiece 2 and the tool electrode 1 decreases.

On the other hand, when the gap between the tool electrode 1 and the workpiece 2 is smaller than the target value, the output Vg of the gap condition detector 3 becomes lower than the target value Vs, so that the gap speed command s, which is the deviation between Vg and Vs, takes a negative value. As a result, the retracting speed command $V_{2x}$, $V_{2y}$, $V_{2z}$ for each axis, which are added to the speed command $V_{1x}$, $V_{1y}$, $V_{1z}$ outputted from the position loop of the servomechanism of each axis, take a negative value, so that the tool electrode 1 moves in the direction opposite to the preset direction with respect to the workpiece 2, that is, the gap between the workpiece 2 and the tool electrode 1 increases.

As described above, the retracting speed commands $V_{2x}$, $V_{2y}$, $V_{2z}$ of a positive or negative value is added to the speed commands $V_{1x}$, $V_{1y}$, $V_{1z}$ inputted to the speed control sections of the servomechanisms 5x, 5y, 5z of each axis, and the resulting values are inputted to the speed control sections in the servomechanism of the corresponding axis, whereby the speed commands of the tool electrode 1 with respect to the workpiece 2 are corrected. In this embodiment, therefore, for not missing the current position in correcting the speed command, the movement amounts Qx, Qy, Qz based on the retracting speed commands are determined by integrating the retracting speed commands $V_{2x}$, $V_{2y}$ and $V_{2z}$ by the integrators 10x, 10y and 10z, respectively, and the determined movement amounts are added to the movement commands Px, Py and Pz of the axes, which are outputted from the command value distribution mechanism 4 to provide movement commands $M_{cx}$, $M_{cy}$ and $M_{cz}$ to the position control section in the respective servomechanisms 5x, 5y and 5z.

It is not always necessary to install the integrators 10x, 10y and 10z for integrating the retracting speed commands $V_{2x}$, $V_{2y}$ and $V_{2z}$, and adding the values to the movement commands of the axes; however, this method is preferable in order to ensure higher accuracy.

Thus, a proper gap is maintained between the tool electrode 1 and the workpiece 2.

Figure 2:
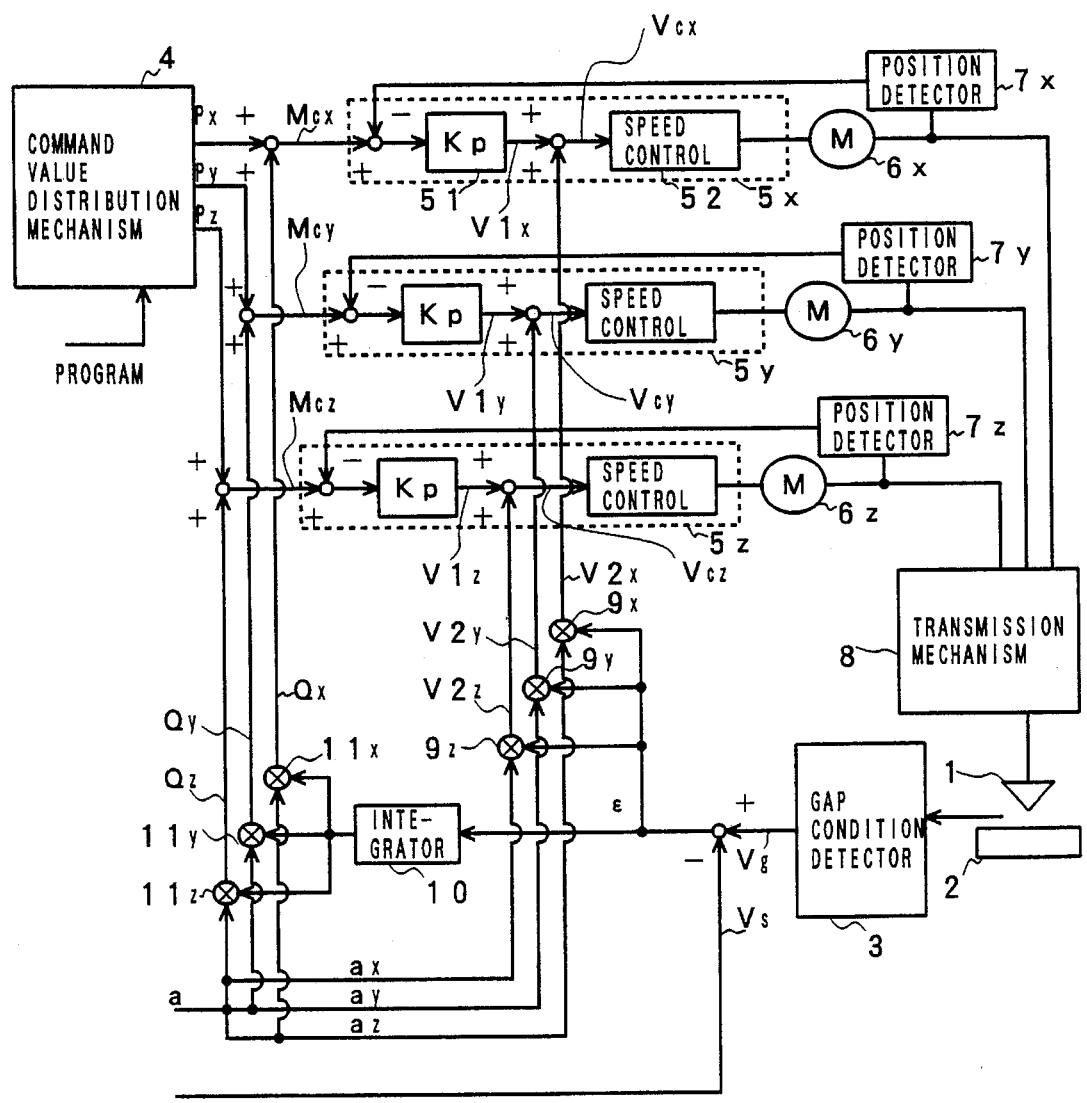
FIG. 2 is a block diagram for the same in accordance with a second embodiment.

FIG. 2 is a block diagram of a second embodiment of the present invention. This embodiment differs from the first embodiment in that the number of integrators is reduced to one, and three multipliers are added to provide six multipliers in total.

In this embodiment shown in FIG. 2, the retracting speed commands $V_{2x}$, $V_{2y}$ and $V_{2z}$ for X, Y and Z axes are determined by multiplying the gap speed command ∈, which is determined by subtracting the target value Vs from the detected value Vg detected by the gap condition detector 3, by each axial component of the preset direction vector, and the retracting speed commands $V_{2x}$, $V_{2y}$ and $V_{2z}$ are added to the speed commands outputted from the position control sections of the servomechanisms 5x, 5y and 5z to provide the speed commands to the speed control section. This process is the same as that of the first embodiment shown in FIG. 1.

In the second embodiment, however, the aforementioned gap speed command ∈ is integrated by one integrator 10, and the integrated value is multiplied by each axial component value of the direction vector by means of the multipliers 11x, 11y and 11z, and the outputs Qx, Qy and Qz of the multipliers are added to the corresponding movement commands Px, Py and Pz outputted from the command value distribution mechanism 4, respectively. The second embodiment differs from the first embodiment in this respect.

In other words, in the first embodiment, the correction movement amounts Qx, Qy, Qz to be inputted to the position control sections in the servomechanisms 5x, 5y, 5z are obtained by integrating the product of the gap speed command (Vg–Vs) and the axial component of the direction vector (the first embodiment shown in FIG. 1), while, in the second embodiment, the gap speed command is first integrated, and the integrated value is multiplied by the axial component of the direction vector (the second embodiment shown in FIG. 2).

As is clear from the above description, the first embodiment shown in FIG. 1 requires three integrators, whose number is the same as the number of axes, while the second embodiment shown in FIG. 2 needs only one integrator. This means that the time required for the processing by a computer in carrying out the second embodiment, as the time required for computation, is dependent on the number of integrators. In the second embodiment in which six multipliers (9x–9z, 11x–11z) are used, it is possible that errors are more prone to occur as compared with the first embodiment using three multipliers, since the word length of computation is finite. In the first embodiment shown in FIG. 1, however, the errors are accumulated individually in the integrators 10x–10z for each axis, and, as a result, the retracting amounts Qx, Qy, Qz, which are a composite of the direction vector and the output of integrators 10x–10z, have errors in the direction of the movement vector. Where as in the second embodiment shown in FIG. 2, which has one integrator 10, the retracting amounts Qx, Qy, Qz are determined by multiplying the output of the integrator 10 by the axial components of the direction vector, so that the direction vector agrees with the direction of the retracting amounts, and no error occurs.

Figure 7:
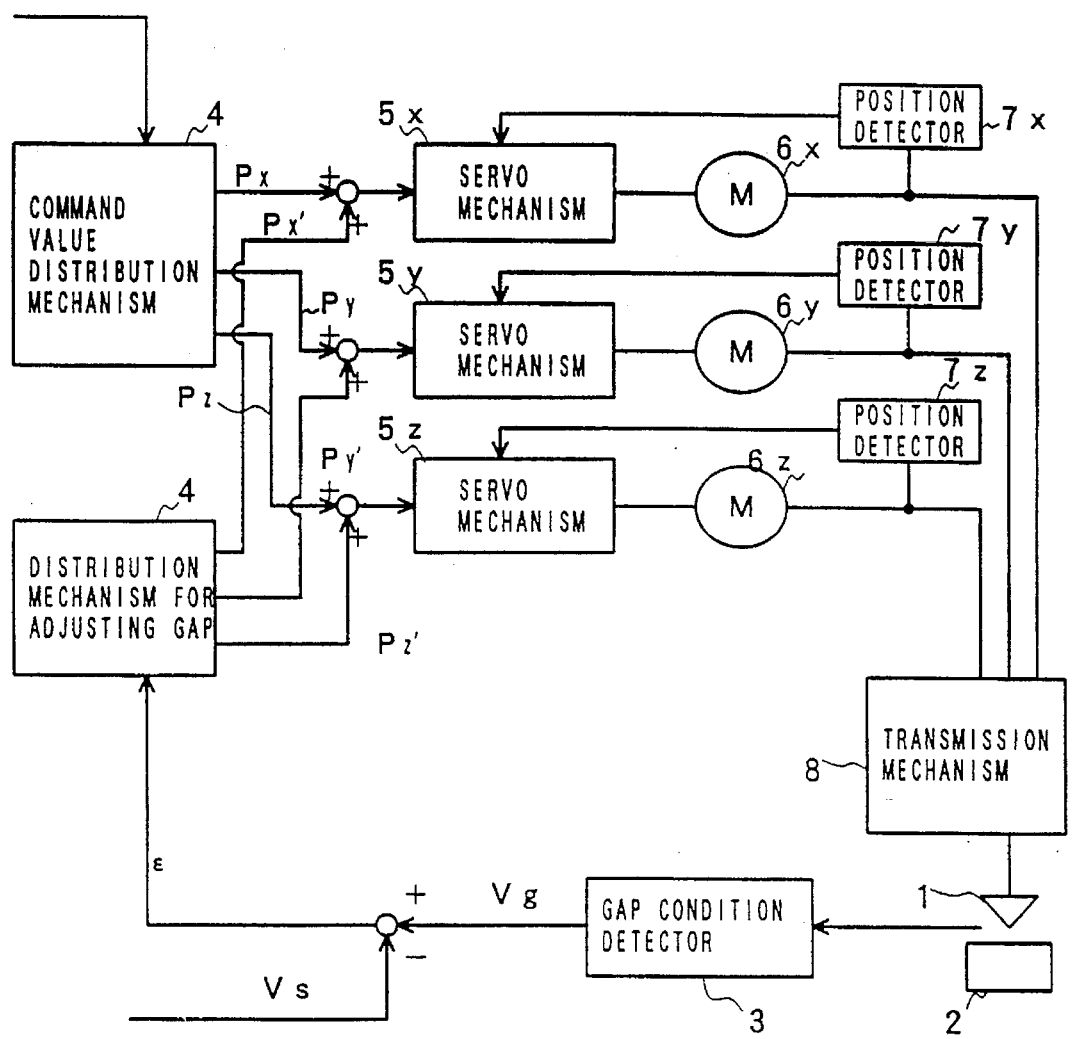
FIG. 7 is a block diagram of another conventional method, different from that of FIG. 6, for the relative feed control of the tool electrode with respect to the workpiece.

In either of the embodiments described above, the electric discharge condition of the electric discharging gap is detected, and the result of detection is fed back directly to the speed control section in the servomechanism which controls the gap between the electrode and the workpiece. As described with reference to FIGS. 6 and 7, in the conventional method, the detected electric discharge condition is fed back to the position loop. In general, the speed loop processing period is shorter than the distribution period and the position loop processing period (normally, the speed loop processing period is one-fourth or one-eighth of the distribution period). Therefore, the embodiment of the present invention offers advantages of short delay time and high band width.

In general, in the multiple feedback loop, it is naturally required that the minor loop located on the inner side should have the bandwidth of a higher response to stabilize the whole system. Therefore, in either of the first and the second embodiments described above, the speed loop in the servomechanisms 5x, 5y, 5z have a higher frequency response than the position detectors (7x, 7y, 7z) and the position loop gain Kp as well as the position loop including the speed control section 52 itself, so that stable control of electric discharge can be made available.

Figure 3:
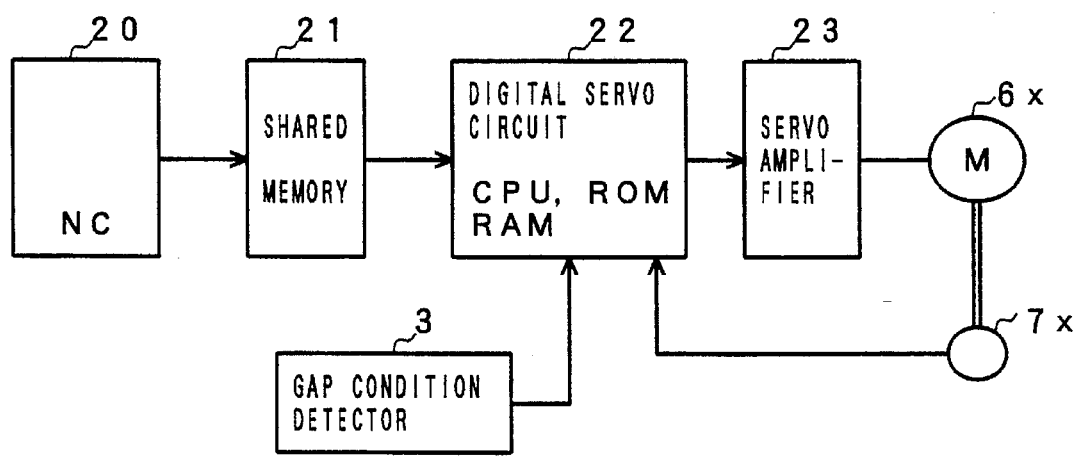
FIG. 3 is a block diagram of the principal part of an electrical discharge control apparatus for carrying out the first and second embodiments of the present invention.

FIG. 3 is a block diagram of a controlling apparatus for carrying out the above-described embodiments. In FIG. 3, reference numeral 20 denotes a numerical control unit for controlling the electric discharge machine, and 21 denotes a shared memory. A digital servo circuit 22, which constitutes the servomechanism, is composed of a processor and memory such as ROM, RAM, etc. Reference numeral 23 denotes a servoamplifier, 6x a servomotor for driving the X axis, 7x a position detector for detecting the rotational position speed of the servomotor, and 3 the aforementioned gap condition detector. FIG. 3 shows only the X axis, the illustration of other axes (Y axis, Z axis) being omitted. The controlling apparatus shown in FIG. 3 is the same as the conventional controlling apparatus except that the output of the gap condition detector 3 is inputted to the digital servo circuit, though it has been inputted to the numerical control unit in the conventional controlling apparatus.

With the above configuration, the numerical control unit 20 reads the machining program, writes the movement command to each axis for each distribution period into the shared memory 21, and also writes the direction vector a (ax, ay, az) which is set together with the movement command.

On the other hand, the processor of the digital servo circuit 22 reads the movement command from the shared memory, determines the movement command for a position loop processing period by equally dividing the movement command, executes the position loop processing, speed loop processing, aforementioned retracting processing and current loop processing, and drives the servomotor 6x.

Figure 4A:
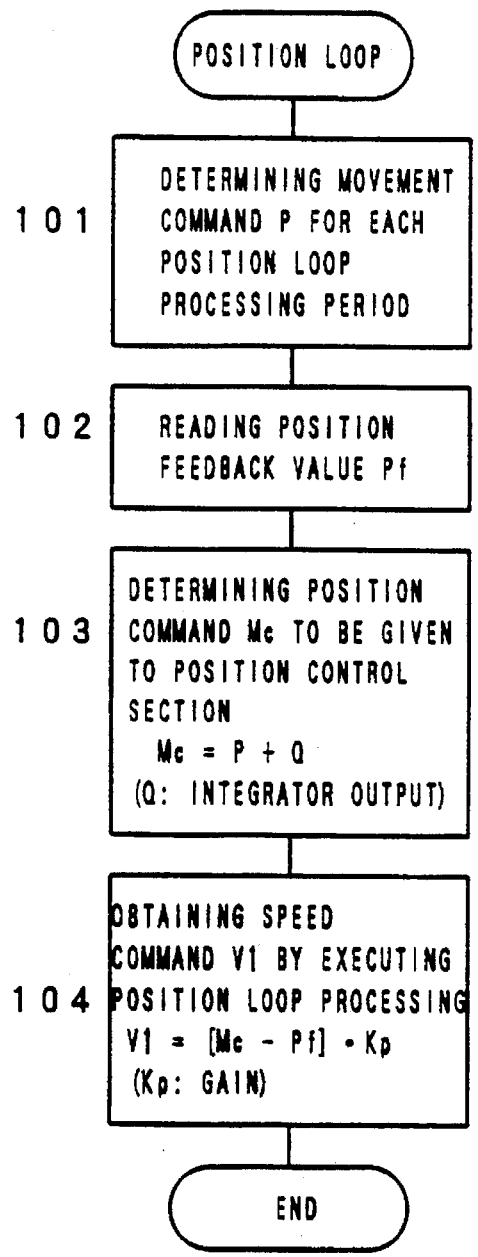
FIGS. 4(a) and (4(b) are flowcharts of the processing for each position loop processing period and for each speed loop processing period in the first embodiment, which is performed by a processor of a digital servo circuit in 10 the electric discharge machining apparatus shown in FIG. 3.
Figure 4B:
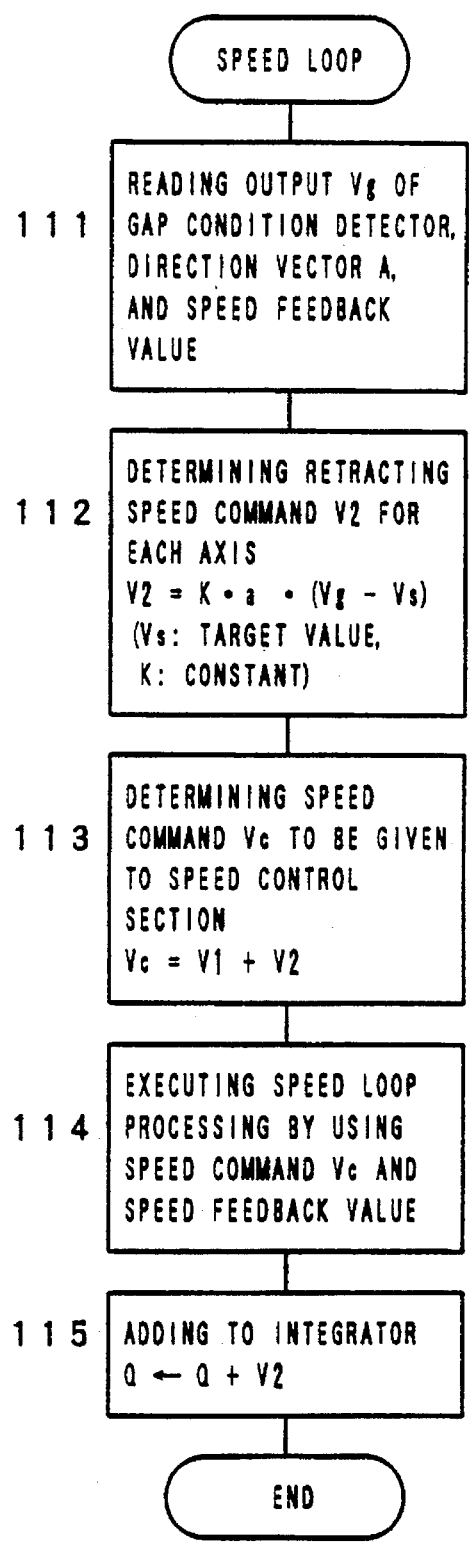

FIGS. 4(a) and 4(b) are flowcharts of the processing executed by the processor of the digital servo circuit 22, in which the processing is executed for the position loop processing period and the speed loop processing period in the first embodiment of the present invention shown in FIG. 1.

The processor of the digital servo circuit 22 reads the movement command for each distribution period, which is read from the shared memory 21, and determines each axial movement command Px, Py, Pz for each position command period by DDA processing etc. (Step 101). Further, the processor reads the position feedback values $P_{fx}$, $P_{fy}$, $P_{fz}$ from the position detector (Step 102). Next, the retracting amounts QX, Qy, Qz, which are stored in the accumulator Ax, Ay, Az for each axis as the integrators 10x, 10y, 10z, are added to the movement commands Px, Py, Pz, which are determined in Step 101, for each axis to determine the movement commands $M_{cx}$, $M_{cy}$, $M_{cz}$, which are given to the position control section in the servomechanisms 5x, 5y, 5z (Step 103). Then, a position deviation for each axis is determined by subtracting the position detection output, which is fed back from the position detectors 7x, 7y, 7z, from the thus determined movement commands $M_{cx}$, $M_{cy}$, $M_{cz}$; the position loop processing is executed by multiplying the determined position deviation by the position loop gain Kp to determine the speed commands $V_{1x}$, $V_{1y}$, $V_{1z}$; and the processing of the position loop processing period ends by storing the results (Step 104). This processing shown in FIG. 4(a) is repeatedly executed for each position loop processing period.

Next, the processor of the digital servo circuit 22 executes the speed loop processing shown in FIG. 4(b) N Limes in the aforementioned position loop processing period (the speed loop processing period is 1/N of the position loop processing period, usually N=1, 2 or 4).

First, the processor reads the output Vg of the gap condition detector, the direction vector a (ax, ay, az) stored in the shared memory 21, and the speed feedback value (Step 111). Next, the retracting speed commands $V_{2x}$, $V_{2y}$, $V_{2z}$ for each axis are determined by multiplying the value ($\in$), which is obtained by subtracting the preset target value Vs from the read output Vg of the gap condition detector, by each axial component ax, ay, az of the direction vector, and by multiplying the result by a constant of proportionality K (Step 112). Then, the speed commands $V_{cx}$, $V_{cy}$, $V_{cz}$, which are given to the position control section in the servomotors 5x, 5y, 5z, are determined by adding the determined retracting speed commands $V_{2x}$, $V_{2y}$, $V_{2z}$ to the speed commands $V_{1x}$, $V_{1y}$, $V_{1z}$, which have been determined in the Step 104 fop the above-described position loop processing (Step 113). The speed loop processing, which is similar to the conventional processing, is performed by using the determined speed commands $V_{cx}$, $V_{cy}$, $V_{cz}$ and the speed feedback values read in Step 111 to determine the torque command to each axis, which is transferred to the current loop (Step 114). The retracting speed commands $V_{2x}$, $V_{2y}$ and $V_{2z}$ determined in Step 112 are added to the accumulators Ax, Ay and Az, respectively, and the processing of the speed loop processing period ends.

In the current loop, the current loop processing is performed; the servomotor for each axis is driven, and the workpiece 2 is machined into a shape programmed the machining program while adjusting the gap between the tool electrode 1 and the workpiece 2. Thereafter, the processings in the above-described Steps 111 to 115 are repeatedly executed for each speed loop processing period.

Figure 5A:
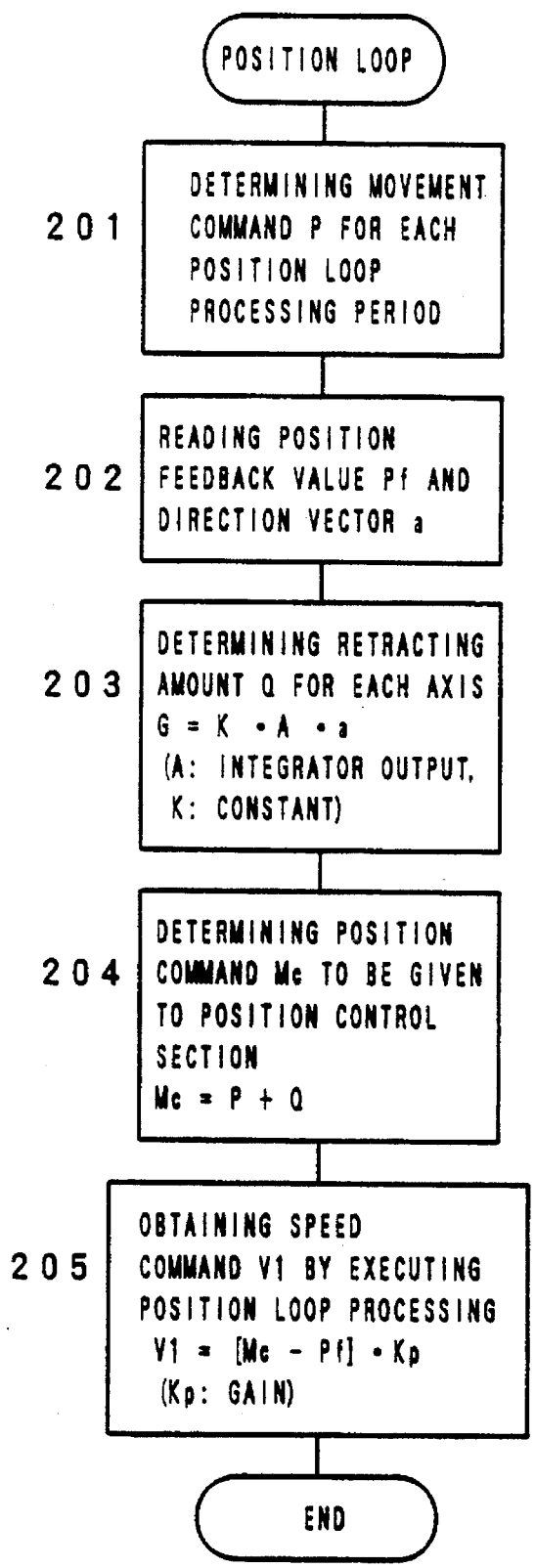
FIGS. 5(a) and 5(b) and flowcharts of the processing for each position loop processing period and for each speed loop processing period in the second embodiment.
Figure 5B:
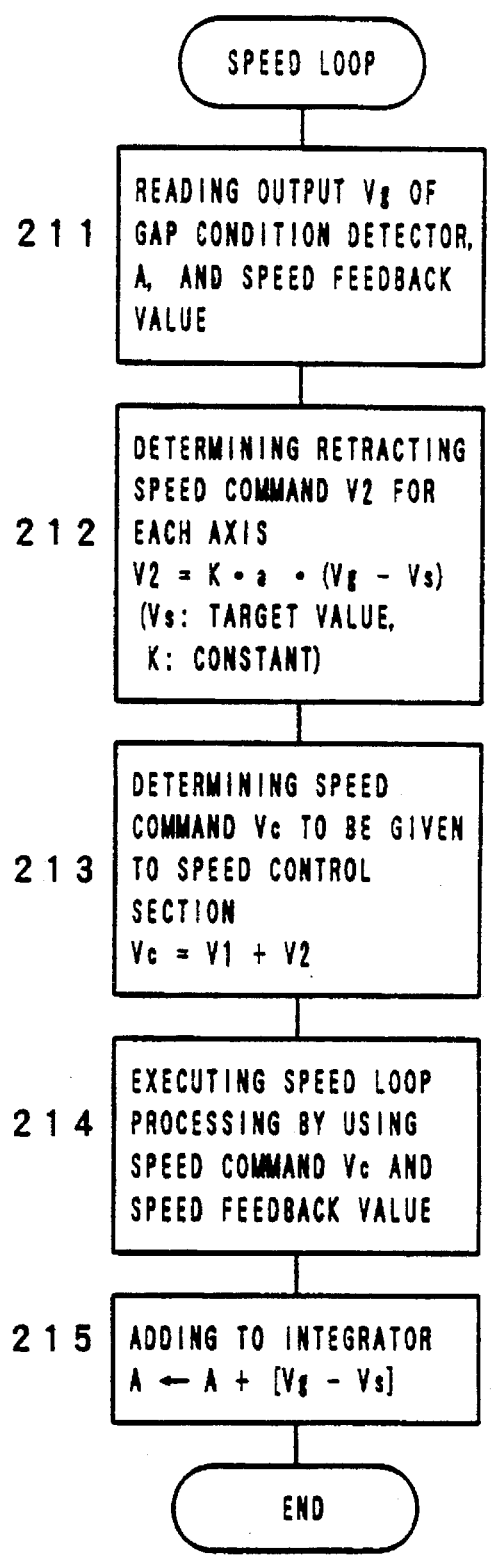

FIGS. 5(a) and 5(b) are flowcharts of the processings executed by the processor of the digital servo circuit 22, in which the processings are executed for the position loop processing period and the speed loop processing period for the second embodiment of the present invention shown in FIG. 2.

Steps 201 and 202 in the position loop processing are the same as Steps 101 and 102 of the first embodiment except that the direction vector a (ax, ay, az) stored in the shared memory 21 is read in Step 202. The processings of Steps 203 and 204 for determining the movement command, which correspond to Step 103 of the first embodiment, differ from those of the first embodiment. Specifically, the retracting amounts Qx, Qy, Qz for each axis are determined by multiplying the integrated value of accumulator A, which integrates and stores the deviation $\epsilon$ (=Vg−Vs) between the output Vg of the gap condition detector and the target value Vs, by each axial component of direction vector a, and by multiplying the resultant value by a constant of proportionality K (Step 203). Then, the movement commands $M_{cx}$, $M_{cy}$, $M_{cz}$, which are given to the position control section in the servomechanisms 5x, 5y, 5z for each axis, are determined by adding the determined retracting amount to the movement commands Px, Py, Pz determined in Step 201 (Step 204). The position loop processing is executed using the determined movement command and the position feedback value, which are the output from the position detectors 7x, 7y, 7z, to obtain the speed commands $V_{1x}$, $V_{1y}$, $V_{1z}$, and the speed commands $V_{1x}$, $V_{1y}$, $V_{1z}$ are stored (Step 205), whereby the position loop processing in the processing period ends.

On the other hand, the speed loop processing shown in FIG. 5(b) is almost the same as the speed loop processing of the first embodiment shown in FIG. 4(b) (the speed loop processing shown in FIG. 5(b) executes N cycles of processing in the position loop processing period as with the first embodiment). The speed loop processing shown in FIG. 5(b) differs from that shown in FIG. 4(b) in that in Step 211 corresponding to Step 111 of the first embodiment, the direction vector a need not be read because it has already been read in Step 202, and that, in the processing of Step 215 of the second embodiment corresponding to Step 115 of the first embodiment, the deviation ($\epsilon$=Vg−Vs) between the read output Vg of the gap condition detector and the target value Vs is added to the accumulator A. Other Steps 212 to 214 are the same as Steps 112 to 114 of the first embodiment.

Two embodiments have been described above. As seen from these embodiments, the feedback processing for adjusting the gap between the tool electrode 1 and the workpiece 2 is carried out for each speed loop processing period, which is shorter than the distribution period and the position loop processing period, in accordance with the electric discharge condition of the gap detected by the gap condition detector 3, and this results in a decrease in delay and stable electric discharge machining control.

We claim:

1. A method for controlling electric discharge machining comprising:

detecting an electric discharge machining condition of a gap between a tool electrode and a workpiece;

producing speed commands for input into a speed loop from a deviation between the detected value of said electric discharge machining condition and a target value of said electric discharge machining condition;

correcting said speed commands with a position loop based upon a position deviation between a target position of said tool electrode and an actual position of said tool electrode;

driving a servomechanism in response to the corrected speed commands to relatively move said tool electrode with respect to said workpiece so that a detected value of said electric discharge machining condition agrees with a target value of said electric discharge machining condition.

2. A method for controlling electric discharge machining according to claim 1, wherein a value for correction of the speed commands is integrated to produce an integrated value which is added to a movement command before being input into the position loop.

3. A method for controlling electric discharge machining according to claim 2, wherein the correction of said speed commands and the correction of a position command are executed for a plurality of position loop processing periods and speed loop processing periods, respectively.

4. A method for controlling electric discharge machining according to claim 1, wherein values, which are proportional to values obtained by multiplying each of a plurality of axial component values of a preset direction vector by said position deviation, are used for correction of a plurality of speed commands provided to a plurality of speed loops corresponding to a plurality of servomechanisms.

5. A method for controlling electric discharge machining according to claim 4, wherein said position deviation is integrated, and the values which are proportional to the values obtained by multiplying each of said axial component values of the preset direction vector by said integrated deviation, are added to the movement commands before being input into a corresponding plurality of position loops.

6. A method for controlling electric discharge machining according to claim 5, wherein the correction of said speed commands is executed for a plurality of speed loop processing periods.

7. A method for controlling electric discharge machining according to claim 4, wherein the values for correction of the speed commands are integrated, and the integrated values are added to a plurality of movement commands before being input to a corresponding plurality of position loops.

8. An apparatus for controlling electric discharge machining comprising:

a numerical control unit responsive to a machining program for controlling an electric discharge machine and for writing a movement command and a retracting direction, together with said movement command, for each of a plurality of axes and for a plurality of distribution periods, into a memory;

a plurality of servomechanisms having a plurality speed control sections corresponding to each of said axes for moving a tool electrode with respect to a workpiece by equally dividing the movement commands read from said memory to determine corresponding movement commands for each of a plurality of position loop processing periods, by executing position loop processing, speed loop processing and current loop processing, respectively, and by driving the servomechanism for each axis of said plurality of axes;

an electric discharge machining condition detecting device for monitoring an electric discharge condition in a gap between the tool electrode and the workpiece during electric discharge machining;

a plurality of position detectors for detecting rotational position and speed of a plurality of servomotors;

retracting speed command generating means for multiplying a deviation between an output from said electric discharge machining condition detecting device and a target electric discharge machining condition value by each of plurality of axial components of the retracting direction stored in said memory and by a predetermined constant to thereby produce a plurality of corresponding retracting speed commands; and speed command correcting means for directly providing the retracting speed commands output from said retracting speed command generating means to corresponding speed control sections in the servomechanisms.

9. An apparatus for controlling electric discharge machining according to claim 8, wherein said servomechanisms have a plurality of position control sections corresponding to each of said axes, said controlling apparatus further comprising:

integrators for integrating the retracting speed commands, which are output from said retracting speed command generating means; and position command correcting means for communicating the output of said integrators to corresponding position control sections in the servomechanisms.

10. An apparatus for controlling electric discharge machining according to claim 8, wherein said controlling apparatus further comprises:

an integrator for integrating the deviation between the output from said electric discharge machining condition detecting device and the target electric discharge machining condition value and producing an integrated output;

retracting amount calculating means for producing a retracting amount for each axis by multiplying the output of said integrator by each axial component of the retracting direction stored in said memory and by a predetermined constant; and position command correcting means for providing the output of said retracting amount calculating means to corresponding position control sections in the servomechanism.

11. An apparatus for controlling electric discharge machining according to claim 8, wherein said servomechanism is composed of a digital servo circuit.

12. An electric discharge machining apparatus for applying an electric discharge across a gap between a tool electrode and a workpiece, comprising:

an input for communicating a movement amount and a target value, each corresponding to respective positions of the tool electrode;

a servomechanism having:

a position loop connected to the input and receiving the movement amount therefrom, said position loop outputting a speed command in response to the received movement amount, and a speed loop connected to the position loop and receiving the speed command therefrom by way of an intermediate node and outputting a servomotor control signal in response thereto;

a servomotor electrically connected to the servomechanism and receiving the servomotor control signal therefrom;

a gap condition detector for detecting a value corresponding to an electrical discharge machining condition of the gap between the tool electrode and the workpiece and receiving the target value, said gap condition detector outputting a deviation value in response to the detected value and the target value;

a multiplier connected to the gap condition detector and receiving the deviation value therefrom, said multiplier outputting a retracting speed command to said intermediate node, wherein the speed command and the retracting speed command cooperate to position the tool electrode about the workpiece.

13. An electric discharge machining apparatus according to claim 12, further comprising:

an integrator connected between the multiplier and the position loop, wherein the integrator receives and integrates the retracting speed command from the multiplier and outputs a correction movement amount in response thereto, said correction movement amount and said movement amount cooperating to provide a combined input to the position loop.

14. An electric discharge machining apparatus according to claim 12, further comprising:

a second servomechanism having:

a second position loop connected to the input and receiving a second movement amount therefrom, said second position loop outputting a second speed command in response to the second movement amount, and a second speed loop connected to the second position loop and receiving the second speed command therefrom by way of a second intermediate node and outputting a second servomotor control signal in response thereto;

a second servomotor electrically connected to the second servomechanism and receiving the second servomotor control signal therefrom;

a second multiplier connected to the gap condition detector and receiving the deviation value therefrom, said second multiplier outputting a second retracting speed command to said second intermediate node, wherein the second speed command and the second retracting speed command cooperate to position the tool electrode about the workpiece by way of the second servomotor.

15. An electric discharge machining apparatus according to claim 14, further comprising:

a third servomechanism having:

a third position loop connected to the input and receiving a third movement amount therefrom, said third position loop outputting a third speed command in response to the third movement amount, and a third speed loop connected to the third position loop and receiving the third speed command therefrom by way of a third intermediate node and outputting a third servomotor control signal in response thereto;

a third servomotor electrically connected to the third servomechanism and receiving the third servomotor control signal therefrom;

a third multiplier connected to the gap condition detector and receiving the deviation value therefrom, said third multiplier outputting a third retracting speed command to said third intermediate node, wherein the third speed command and the third retracting speed command cooperate to position the tool electrode about the workpiece by way of the third servomotor.

16. An electric discharge machining apparatus according to claim 15, further comprising:

an integrator connected between the multiplier and the position loop, the second position loop and the third position loop, wherein the integrator receives and integrates the deviation value received from the gap condition detector and outputs a correction movement amount, a second correction movement amount, and a third correction movement amount in response thereto, said correction movement amounts and said movement amounts cooperating to provide combined inputs to the respective first, second, and third position loops.

17. An electric discharge machining apparatus according to claim 15, further comprising:

an integrator connected between the multiplier and the position loop, wherein the integrator receives and integrates the retracting speed command from the multiplier and outputs a correction movement amount in response thereto, said correction movement amount and said movement amount cooperating to provide a combined input to the position loop;

a second integrator connected between the second multiplier and the second position loop, wherein the second integrator receives and integrates the second retracting speed command from the second multiplier and outputs a second correction movement amount in response thereto, said second correction movement amount and said second movement amount cooperating to provide a combined input to the second position loop;

a third integrator connected between the third multiplier and the third position loop, wherein the third integrator receives and integrates the third retracting speed command from the third multiplier and outputs a third correction movement amount in response thereto, said third correction movement amount and said third movement amount cooperating to provide a combined input to the third position loop.

* * * * *